(12) United States Patent
Nelson et al.

(10) Patent No.: US 11,347,519 B2
(45) Date of Patent: May 31, 2022

(54) SYSTEMS AND METHODS FOR DETECTING SHORT-TERM CHANGES TO BIOS SETUP

(71) Applicant: Dell Products L.P., Round Rock, TX (US)

(72) Inventors: Amy C. Nelson, Round Rock, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/884,985

(22) Filed: May 27, 2020

(65) Prior Publication Data
US 2021/0373903 A1 Dec. 2, 2021

(51) Int. Cl.
| | |
|---|---|
| G06F 9/00 | (2006.01) |
| G06F 9/4401 | (2018.01) |
| G06F 11/34 | (2006.01) |
| G06F 21/60 | (2013.01) |
| G06F 8/654 | (2018.01) |

(52) U.S. Cl.
CPC ............ *G06F 9/4401* (2013.01); *G06F 8/654* (2018.02); *G06F 11/34* (2013.01); *G06F 21/602* (2013.01); *G06F 9/4406* (2013.01)

(58) Field of Classification Search
CPC ........ G06F 9/4401; G06F 8/654; G06F 11/34; G06F 21/602
USPC ............................................................ 713/2
See application file for complete search history.

(56) References Cited

U.S. PATENT DOCUMENTS

| | | | | |
|---|---|---|---|---|
| 7,904,708 B2* | 3/2011 | Harmer | ............... | G06F 9/44505 |
| | | | | 713/2 |
| 7,962,759 B2* | 6/2011 | Freeman | ............... | G06F 21/572 |
| | | | | 713/189 |
| 8,132,055 B2* | 3/2012 | Anderson | ........... | G06F 11/2284 |
| | | | | 714/36 |
| 9,519,785 B2* | 12/2016 | Martinez | ............. | G06F 9/44505 |
| 9,710,340 B2* | 7/2017 | Scott | .................... | G06F 11/2284 |
| 2002/0133695 A1* | 9/2002 | Khatri | .................... | G06F 9/4411 |
| | | | | 713/1 |
| 2003/0037231 A1* | 2/2003 | Goodman | ............. | G06F 9/4401 |
| | | | | 713/2 |
| 2003/0065915 A1* | 4/2003 | Yu | ........................ | G06F 11/1417 |
| | | | | 713/1 |
| 2003/0233535 A1* | 12/2003 | Nunn | ..................... | G06F 9/4408 |
| | | | | 713/1 |
| 2004/0205329 A1* | 10/2004 | Wu | ........................ | H04L 41/082 |
| | | | | 713/2 |

(Continued)

*Primary Examiner* — Volvick Derose
(74) *Attorney, Agent, or Firm* — Jackson Walker L.L.P.

(57) ABSTRACT

An information handling system may include a processor and a basic input/output system (BIOS) comprising a program of instructions executable by the processor and configured to cause the processor to initialize one or more information handling resources of the information handling system. The BIOS may be further configured to, during a boot of the information handling system, determine whether a BIOS configuration change has been made during a current boot session of the information handling system, and responsive to determining that a BIOS configuration change has been made during the current boot session, store an indication of the BIOS configuration change to a non-volatile memory.

15 Claims, 2 Drawing Sheets

(56) References Cited

U.S. PATENT DOCUMENTS

| | | | |
|---|---|---|---|
| 2004/0215954 A1* | 10/2004 | Piwonka | G06F 9/4411 713/100 |
| 2008/0235501 A1* | 9/2008 | Bailey | G06F 11/1004 713/1 |
| 2009/0006836 A1* | 1/2009 | Takeda | G06F 8/65 713/2 |
| 2011/0099627 A1* | 4/2011 | Proudler | G06F 21/57 726/21 |
| 2012/0191963 A1* | 7/2012 | Chen | G06F 8/65 713/2 |
| 2013/0013905 A1* | 1/2013 | Held | G06F 21/575 713/2 |
| 2013/0185789 A1* | 7/2013 | Hagiwara | G06F 21/572 726/18 |
| 2016/0055069 A1* | 2/2016 | Jeansonne | G06F 3/0683 714/15 |
| 2017/0123923 A1* | 5/2017 | Chang | G06F 21/575 |
| 2019/0087582 A1* | 3/2019 | Villatel | G06F 21/572 |
| 2020/0073652 A1* | 3/2020 | Chen | G06F 8/65 |
| 2020/0320200 A1* | 10/2020 | Singh | G06F 9/4401 |
| 2021/0042047 A1* | 2/2021 | Shibayama | G06F 3/0604 |

\* cited by examiner

SYSTEMS AND METHODS FOR DETECTING SHORT-TERM CHANGES TO BIOS SETUP

TECHNICAL FIELD

The present disclosure relates in general to information handling systems, and more particularly to detecting short-term changes to configuration setup of a basic input/output system of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, an information handling system may include a basic input/output system (BIOS). Generally speaking, a BIOS may include any system, device, or apparatus configured to identify, test, and/or initialize information handling resources of an information handling system. In some instances, a BIOS may include a Unified Extensible Firmware Interface (UEFI). A BIOS may comprise boot firmware configured to be the first code executed by an information handling system when the information handling system is booted and/or powered on. As part of its initialization functionality, code for a BIOS may be configured to set components of an information handling system into a known state, so that one or more applications (e.g., an operating system or other application programs) stored on compatible media may be executed by and given control of the information handling system.

Configuration settings for a BIOS can often be modified through a "BIOS setup" program. Typically, an individual physically present at an information handling system can enter BIOS setup by entering a defined hotkey and/or entering a defined set of keystrokes on a keyboard communicatively coupled to the information handling system during a particular portion of information handling system boot.

Unfortunately, in existing BIOS implementations, BIOS setup may be used by a malicious actor to commit malicious acts. A physically-present attacker may modify BIOS configuration via BIOS setup on an unattended information handling system to undertake malicious acts such as enabling unauthorized boot devices, setting or changing a BIOS password, and/or other acts. In existing approaches, on a normal boot cycle a setup configuration may be measured in platform configuration registers (PCRs) of a Trusted Platform Module or other cryptoprocessor and logged, but the state of such PCRs do not survive a reboot of the information handling system. Accordingly, an attacker may take advantage of this behavior to perpetrate an attack and then reset the configuration in setup (restoring setup state to the original configuration as it existed before the attack), thus removing any traces of the attack.

SUMMARY

In accordance with the teachings of the present disclosure, the disadvantages and problems associated with ensuring security of BIOS configuration may be reduced or eliminated.

In accordance with embodiments of the present disclosure, an information handling system may include a processor and a basic input/output system (BIOS) comprising a program of instructions executable by the processor and configured to cause the processor to initialize one or more information handling resources of the information handling system. The BIOS may be further configured to, during a boot of the information handling system, determine whether a BIOS configuration change has been made during a current boot session of the information handling system, and responsive to determining that a BIOS configuration change has been made during the current boot session, store an indication of the BIOS configuration change to a non-volatile memory.

In accordance with these and other embodiments of the present disclosure, a method may include, during a boot of an information handling system having a basic input/output system (BIOS) comprising a program of instructions executable by the processor and configured to cause the processor to initialize one or more information handling resources of the information handling system, determining, by the BIOS, whether a BIOS configuration change has been made during a current boot session of the information handling system, and responsive to determining that a BIOS configuration change has been made during the current boot session, storing, by the BIOS, an indication of the BIOS configuration change to a non-volatile memory.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, during a boot of an information handling system: determine, by a basic input/output system (BIOS) of the information handling system configured to cause the processor to initialize one or more information handling resources of the information handling system, whether a BIOS configuration change has been made during a current boot session of the information handling system; and responsive to determining that a BIOS configuration change has been made during the current boot session, store, by the BIOS, an indication of the BIOS configuration change to a non-volatile memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
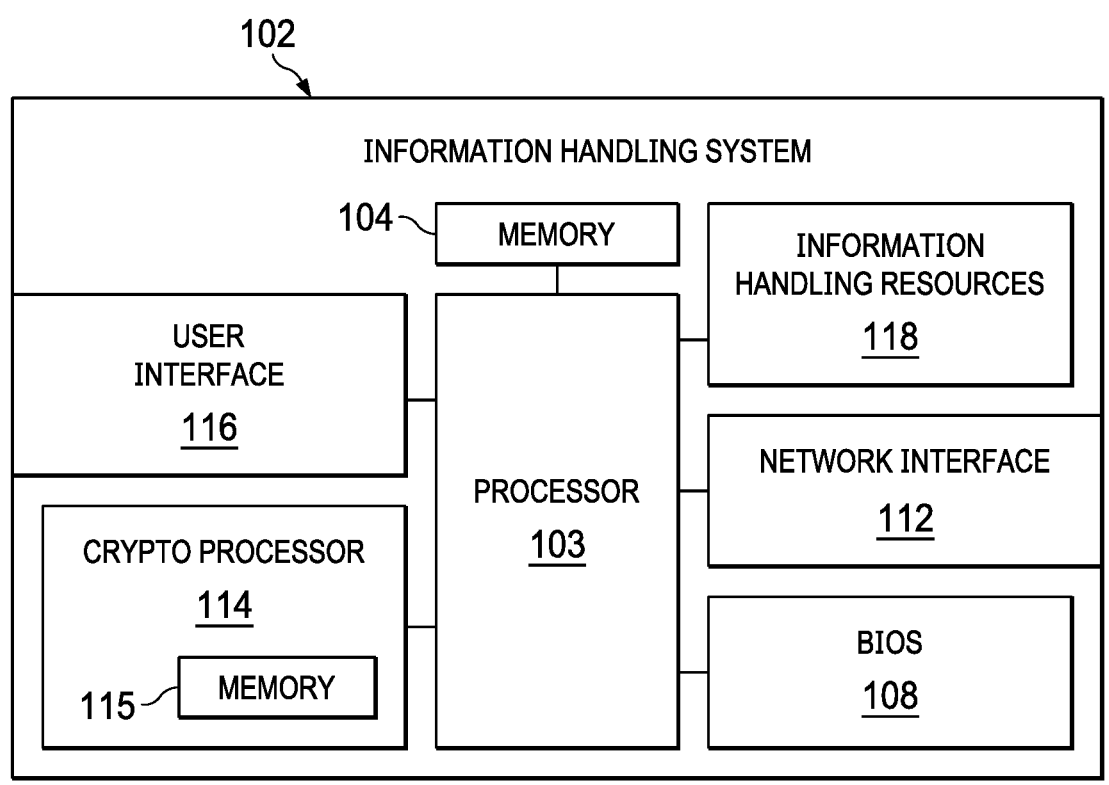
FIG. 1 illustrates a block diagram of an example information handling system, in accordance with embodiments of the present disclosure.
Figure 2:
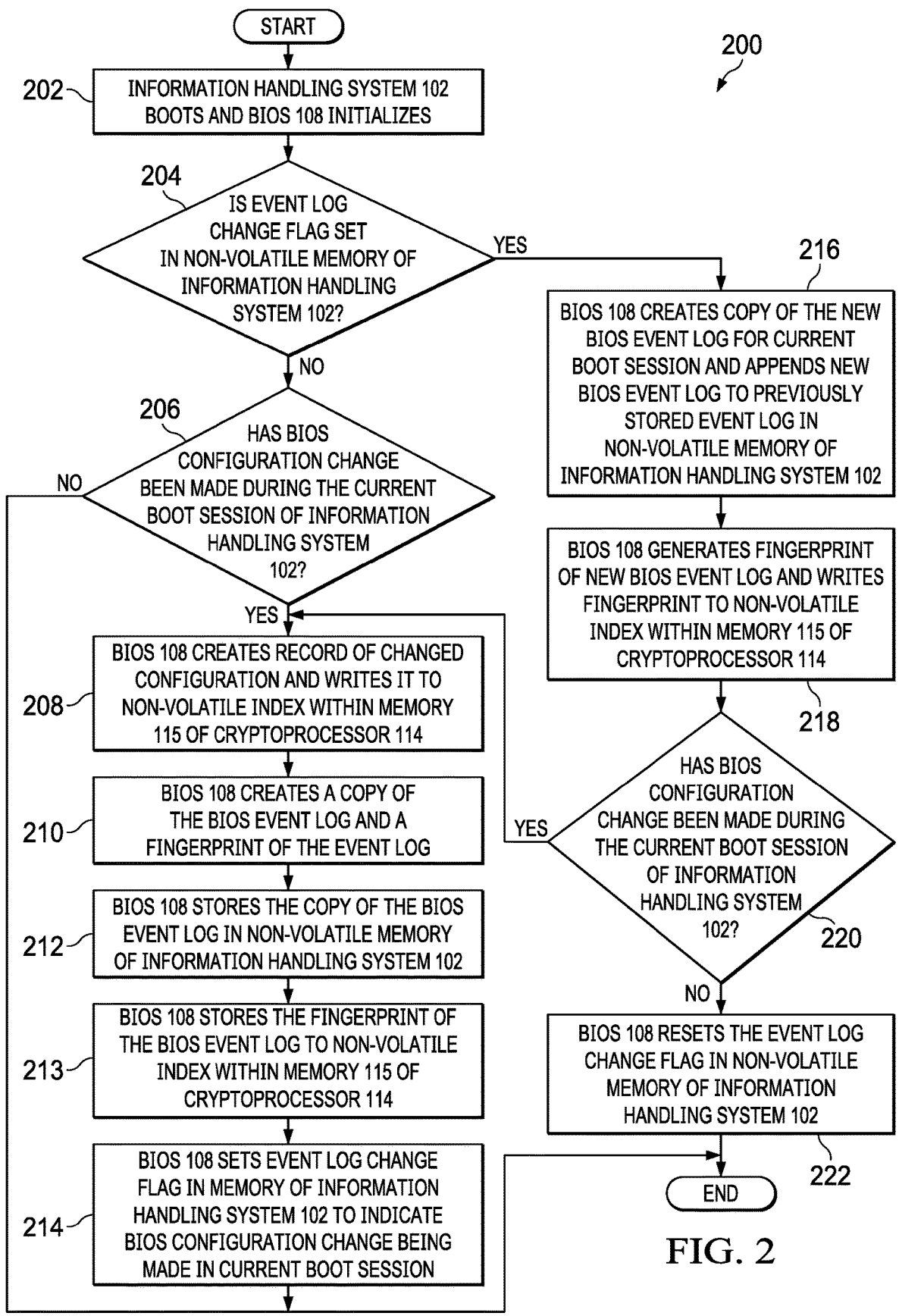
FIG. 2 illustrates a flow chart of an example method for detecting short-term changes to BIOS setup, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, basic input/output system (BIOS) 108 communicatively coupled to processor 103, network interface 112 communicatively coupled to processor 103, a cryptoprocessor 114 communicatively coupled to processor 103, a user interface 116 communicatively coupled to processor 103, and one or more other information handling resources 118 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., an operating system or other application programs) stored on compatible media (e.g., memory 104) may be executed by processor 103 and given control of information handling system 102.

Network interface 112 may include any suitable system, apparatus, or device operable to serve as an interface between information handling system 102 and a network coupled thereto. Network interface 112 may enable information handling system 102 to communicate over network 108 using any suitable transmission protocol and/or standard, including without limitation, Fibre Channel, Frame Relay, Asynchronous Transfer Mode (ATM), Internet protocol (IP), or other packet-based protocol. Network interface 112 may be configured to communicate to via wireless transmissions, wired communications, and/or optical transmissions.

Cryptoprocessor 114 may be communicatively coupled to processor 103 and/or BIOS 108 (e.g., via a suitable communication bus) and may include any system, device, or apparatus configured to carry out cryptographic operations on data communicated to it from processor 103, BIOS 108, and/or another component of information handling system 102. In some embodiments, cryptoprocessor 114 may be compliant with the Trusted Platform Module specification, a successor specification, and/or any other similar specification. In some embodiments, cryptoprocessor 114 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys).

As shown in FIG. 1, cryptoprocessor 114 may comprise a non-volatile memory 115 accessible only to cryptoprocessor 114. Memory 115 may comprise any system, device, or apparatus configured to retain program instructions or data for a period of time (e.g., computer-readable media). Memory 115 may comprise non-volatile random access memory (NVRAM), EEPROM, a PCMCIA card, flash memory, magnetic storage, opto-magnetic storage, or any suitable selection and/or array of non-volatile memory that retains data after power to information handling system 102 is turned off.

User interface 116 may comprise any instrumentality or aggregation of instrumentalities by which a user may interact with information handling system 102. For example, user interface 116 may permit a user to input data and/or instructions into information handling system 102, and/or otherwise manipulate information handling system 102 and its associated components. User interface 116 may also permit information handling system 102 to communicate data to a user, e.g., by way of a display device.

Generally speaking, information handling resources 118 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, in accordance with embodiments of the present disclosure, BIOS 108 and cryptoprocessor 114 may operate in concert to log changes to BIOS configuration and event logs of cryptoprocessor 114 in a manner that survives reboots of information handling system 102. Such logging of changes and event logs may be invisible to a user or malicious attacker and may allow a verifier (e.g., an administrator or software configured to analyze such logging for indicators of attack) in order to detect short-term BIOS configuration changes that may comprise a short-lived attack. Example functionality of BIOS 108 and cryptoprocessor 114 in this regard is described in greater detail below in reference to method 200.

FIG. 2 illustrates a flow chart of an example method 200 for detecting short-term changes to BIOS setup, in accordance with embodiments of the present disclosure. According to one embodiment, method 200 may begin at step 202.

As noted above, teachings of the present disclosure may be implemented in a variety of configurations of information handling system 102.

At step 202, information handling system 102 may boot and BIOS 108 may initialize.

At step 204, BIOS 108 may determine if an event log change flag is set in non-volatile memory (e.g., within a non-volatile portion of memory 104) of information handling system 102. As described below, such a flag may be set during a prior boot session of information handling system 102 responsive to a BIOS configuration change being made in the prior boot session. If the event log change flag is set, method 200 may proceed to step 216. Otherwise, method 200 may proceed to step 206.

At step 206, BIOS 108 may determine if a BIOS configuration change has been made during the current boot session of information handling system 102. If a BIOS configuration change has been made during the current boot session of information handling system 102, method 200 may proceed to step 208. Otherwise, method 200 may end (e.g., which may result in continued execution of BIOS 108 and a boot to an operating system of information handling system 102).

At step 208, responsive to a BIOS configuration change having been made during the current boot session of information handling system 102, BIOS 108 may create a record of the changed configuration and write it to a non-volatile index within memory 115 of cryptoprocessor 114. Having been written to a non-volatile index within memory 115 of cryptoprocessor 114, the record of the changed configuration may be protected by a platform hierarchy of cryptoprocessor 114.

At step 210, BIOS 108 may create a copy of the BIOS event log for the current boot session and generate a fingerprint (e.g., a hash) of the BIOS event log.

At step 212, BIOS 108 may store the event log in non-volatile memory (e.g., within a non-volatile portion of memory 104) of information handling system 102.

At step 213, BIOS 108 may write the fingerprint of the BIOS event log to the non-volatile index within memory 115 of cryptoprocessor 114.

At step 214, BIOS 108 may set the event log change flag in non-volatile memory (e.g., within a non-volatile portion of memory 104) of information handling system 102 to indicate a BIOS configuration change being made in the current boot session of information handling system 102. After completion of step 214, method 200 may end (e.g., which may result in continued execution of BIOS 108 and a boot to an operating system of information handling system 102).

At step 216, in response to the event log change flag being set in non-volatile memory (e.g., thus indicating a BIOS configuration having been made in the prior boot session) of information handling system 102, BIOS 108 may create a copy of the new BIOS event log for the current boot session, and append the new BIOS event log to the previously stored event log in non-volatile memory (e.g., within a non-volatile portion of memory 104) of information handling system 102.

At step 218, BIOS 108 may generate a fingerprint (e.g., a hash) of the new BIOS event log and write such fingerprint to the non-volatile index within memory 115 of cryptoprocessor 114.

At step 220, BIOS 108 may determine if a BIOS configuration change has been made during the current boot session of information handling system 102. If a BIOS configuration change has been made during the current boot session of information handling system 102, method 200 may proceed to step 208. Otherwise, method 200 may proceed to step 222.

At step 222, BIOS 108 may reset the event log change flag in non-volatile memory of information handling system 102 (e.g., thus indicating no BIOS configuration having been made in the current boot session). After completion of step 222, method 200 may end (e.g., which may result in continued execution of BIOS 108 and a boot to an operating system of information handling system 102).

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system (BIOS) comprising a program of instructions executable by the processor and configured to cause the processor to initialize one or more information handling resources of the information handling system, wherein the BIOS is further configured to, during a boot of the information handling system:
      determine whether a prior BIOS configuration change was made during a prior boot session of the information handling system; and
      responsive to determining that a BIOS configuration change was made during the prior boot session, append a new BIOS event log for the current boot session to a prior BIOS event log for the prior boot session;
      after said determining whether a prior BIOS configuration change was made during a prior boot session of the information handling system, determine whether a BIOS configuration change has been made during a current boot session of the information handling system; and
      responsive to determining that a BIOS configuration change has been made during the current boot session, store an indication of the BIOS configuration change to a non-volatile memory.

2. The information handling system of claim 1, wherein:
   the information handling system further comprises a cryptoprocessor communicatively coupled to the processor;
   the BIOS is further configured to create a record of the BIOS configuration change;
   the indication of the BIOS configuration change is the record; and
   the non-volatile memory is a non-volatile index of a memory integral to the cryptoprocessor.

3. The information handling system of claim 1, wherein the indication of the BIOS configuration change is a setting of an event log change flag of the non-volatile memory.

4. The information handling system of claim 1, wherein the indication of the BIOS configuration change is a BIOS event log.

5. The information handling system of claim 1, wherein:
   the information handling system further comprises a cryptoprocessor communicatively coupled to the processor;

the BIOS is further configured to generate a fingerprint of a BIOS event log;

the indication of the BIOS configuration change is the fingerprint of the BIOS event log; and the non-volatile memory is a non-volatile index of a memory integral to the cryptoprocessor.

6. A method comprising, during a boot of an information handling system having a basic input/output system (BIOS) comprising a program of instructions executable by the processor and configured to cause the processor to initialize one or more information handling resources of the information handling system:

determining whether a prior BIOS configuration change was made during a prior boot session of the information handling system; and responsive to determining that a BIOS configuration change was made during the prior boot session, appending a new BIOS event log for the current boot session to a prior BIOS event log for the prior boot session;

after said determining whether a prior BIOS configuration change was made during a prior boot session of the information handling system, determining, by the BIOS, whether a BIOS configuration change has been made during a current boot session of the information handling system; and responsive to determining that a BIOS configuration change has been made during the current boot session, storing, by the BIOS, an indication of the BIOS configuration change to a non-volatile memory.

7. The method of claim 6, wherein:

the information handling system further comprises a cryptoprocessor communicatively coupled to the processor;

the non-volatile memory is a non-volatile index of a memory integral to the cryptoprocessor;

the method further comprises creating, by the BIOS, a record of the BIOS configuration change; and the indication of the BIOS configuration change is the record.

8. The method of claim 6, wherein the indication of the BIOS configuration change is a setting of an event log change flag of the non-volatile memory.

9. The method of claim 6, wherein the indication of the BIOS configuration change is a BIOS event log.

10. The method of claim 6, wherein:

the information handling system further comprises a cryptoprocessor communicatively coupled to the processor;

the non-volatile memory is a non-volatile index of a memory integral to the cryptoprocessor;

the method further comprises generating, by the BIOS, a fingerprint of a BIOS event log; and the indication of the BIOS configuration change is the fingerprint of the BIOS event log.

11. An article of manufacture comprising:

a non-transitory computer readable medium; and computer-executable instructions carried on the computer readable medium, the instructions readable by a processor, the instructions, when read and executed, for causing the processor to, during a boot of an information handling system:

determine whether a prior BIOS configuration change was made during a prior boot session of the information handling system; and responsive to determining that a BIOS configuration change was made during the prior boot session, append a new BIOS event log for the current boot session to a prior BIOS event log for the prior boot session;

after said determining whether a prior BIOS configuration change was made during a prior boot session of the information handling system, determine, by a basic input/output system (BIOS) of the information handling system configured to cause the processor to initialize one or more information handling resources of the information handling system, whether a BIOS configuration change has been made during a current boot session of the information handling system; and responsive to determining that a BIOS configuration change has been made during the current boot session, store, by the BIOS, an indication of the BIOS configuration change to a non-volatile memory.

12. The article of claim 11, wherein:

the information handling system further comprises a cryptoprocessor communicatively coupled to the processor;

the non-volatile memory is a non-volatile index of a memory integral to the cryptoprocessor;

the instructions further for causing the processor to create, by the BIOS, a record of the BIOS configuration change; and the indication of the BIOS configuration change is the record.

13. The article of claim 11, wherein the indication of the BIOS configuration change is a setting of an event log change flag of the non-volatile memory.

14. The article of claim 11, wherein the indication of the BIOS configuration change is a BIOS event log.

15. The article of claim 11, wherein:

the information handling system further comprises a cryptoprocessor communicatively coupled to the processor;

the non-volatile memory is a non-volatile index of a memory integral to the cryptoprocessor;

the instructions further for causing the processor to generate, by the BIOS, a fingerprint of a BIOS event log; and the indication of the BIOS configuration change is the fingerprint of the BIOS event log.

* * * * *